(12) United States Patent
Shimbe et al.

(10) Patent No.: US 10,422,014 B2
(45) Date of Patent: Sep. 24, 2019

(54) HEAT-TREATMENT DEVICE AND HEAT-TREATMENT METHOD

(71) Applicants: THK CO., LTD., Tokyo (JP); Denki Kogyo Company, Limited, Tokyo (JP)

(72) Inventors: Junzo Shimbe, Tokyo (JP); Hiroshi Nakabayashi, Tokyo (JP); Takayuki Sakanoue, Tokyo (JP); Kazuki Yoshiya, Tokyo (JP); Hiroyuki Kai, Tokyo (JP); Shuji Masubuchi, Tokyo (JP); Makoto Nagata, Tokyo (JP)

(73) Assignees: THK CO., LTD., Tokyo (JP); Denki Kogyo Company, Limited, Tokyo (JP)

( * ) Notice: Subject to any disclaimer, the term of this patent is extended or adjusted under 35 U.S.C. 154(b) by 395 days.

(21) Appl. No.: 15/122,313

(22) PCT Filed: Mar. 11, 2015

(86) PCT No.: PCT/JP2015/001334
§ 371 (c)(1),
(2) Date: Aug. 29, 2016

(87) PCT Pub. No.: WO2015/136927
PCT Pub. Date: Sep. 17, 2015

(65) Prior Publication Data
US 2016/0369366 A1    Dec. 22, 2016

(30) Foreign Application Priority Data

Mar. 11, 2014   (JP) .................................. 2014-047839
Mar. 11, 2014   (JP) .................................. 2014-047840

(51) Int. Cl.
*C21D 9/40*   (2006.01)
*H05B 6/42*   (2006.01)
(Continued)

(52) U.S. Cl.
CPC ............... *C21D 9/40* (2013.01); *C21D 1/42* (2013.01); *C21D 1/667* (2013.01); *C21D 9/0062* (2013.01);
(Continued)

(58) Field of Classification Search
CPC ............. C21D 9/40; C21D 1/667; C21D 1/42
See application file for complete search history.

(56) References Cited

U.S. PATENT DOCUMENTS

2008/0141535 A1   6/2008   Rollmann et al.
2010/0243643 A1*  9/2010   Cesano ................... C21D 1/10
                                                                        219/635
(Continued)

FOREIGN PATENT DOCUMENTS

DE    10 2005 006 701 B3    3/2006
DE    10 2009 053 197 A1    5/2011
(Continued)

OTHER PUBLICATIONS

Extended (supplementary) European Search Report dated Jan. 30, 2017, issued in counterpart European Application No. 15761594.9. (7 pages).
(Continued)

*Primary Examiner* — Scott R Kastler
(74) *Attorney, Agent, or Firm* — Westerman, Hattori, Daniels & Adrian, LLP

(57) ABSTRACT

A heat-treatment device 10 includes a table 11 on which a ring-shaped workpiece W can be placed, and a pair of heat processing units 20 for heat-processing the peripheral surface of the workpiece W. The heat-treatment device 10 is used for obtaining the workpiece W having desired properties by the heat-processing the workpiece W while the pair of heat processing units 20 move in opposite directions along the peripheral surface of the workpiece W. The
(Continued)

heat-treatment device 10 is configured in such a way that a pair of revolving arms 30 movable relative to the table 11 oscillate the pair of heat processing units 20 relative to the workpiece W, thereby heat-processing the peripheral surface of the workpiece W. By adopting such a configuration, it is possible to obtain a heat-treatment device heat-processing the entire circumference of a ring-shaped workpiece.

7 Claims, 12 Drawing Sheets

(51) Int. Cl.
    *H05B 6/44* (2006.01)
    *H05B 6/10* (2006.01)
    *C21D 1/42* (2006.01)
    *C21D 1/667* (2006.01)
    *C21D 9/00* (2006.01)
    *H05B 6/36* (2006.01)

(52) U.S. Cl.
    CPC .............. *H05B 6/101* (2013.01); *H05B 6/109* (2013.01); *H05B 6/36* (2013.01); *H05B 6/42* (2013.01); *H05B 6/44* (2013.01); *Y02P 10/253* (2015.11)

(56) References Cited

U.S. PATENT DOCUMENTS

| | | |
|---|---|---|
| 2011/0248023 A1 | 10/2011 | Doyon et al. |
| 2012/0125919 A1* | 5/2012 | Tanaka ................... C21D 1/10 |
| | | 219/635 |
| 2014/0144904 A1 | 5/2014 | Nakatsu et al. |

FOREIGN PATENT DOCUMENTS

| | | |
|---|---|---|
| JP | 36-505 B | 2/1961 |
| JP | 6-200326 A | 7/1994 |
| JP | 2003-342632 A | 12/2003 |
| JP | 2010-222672 A | 10/2010 |
| JP | 2012-219311 A | 11/2012 |
| WO | 2011/107869 A1 | 9/2011 |

OTHER PUBLICATIONS

International Search Report dated May 26, 2015, issued in counterpart international application No. PCT/JP2015/001334 (2 pages).

* cited by examiner

[Fig.1]
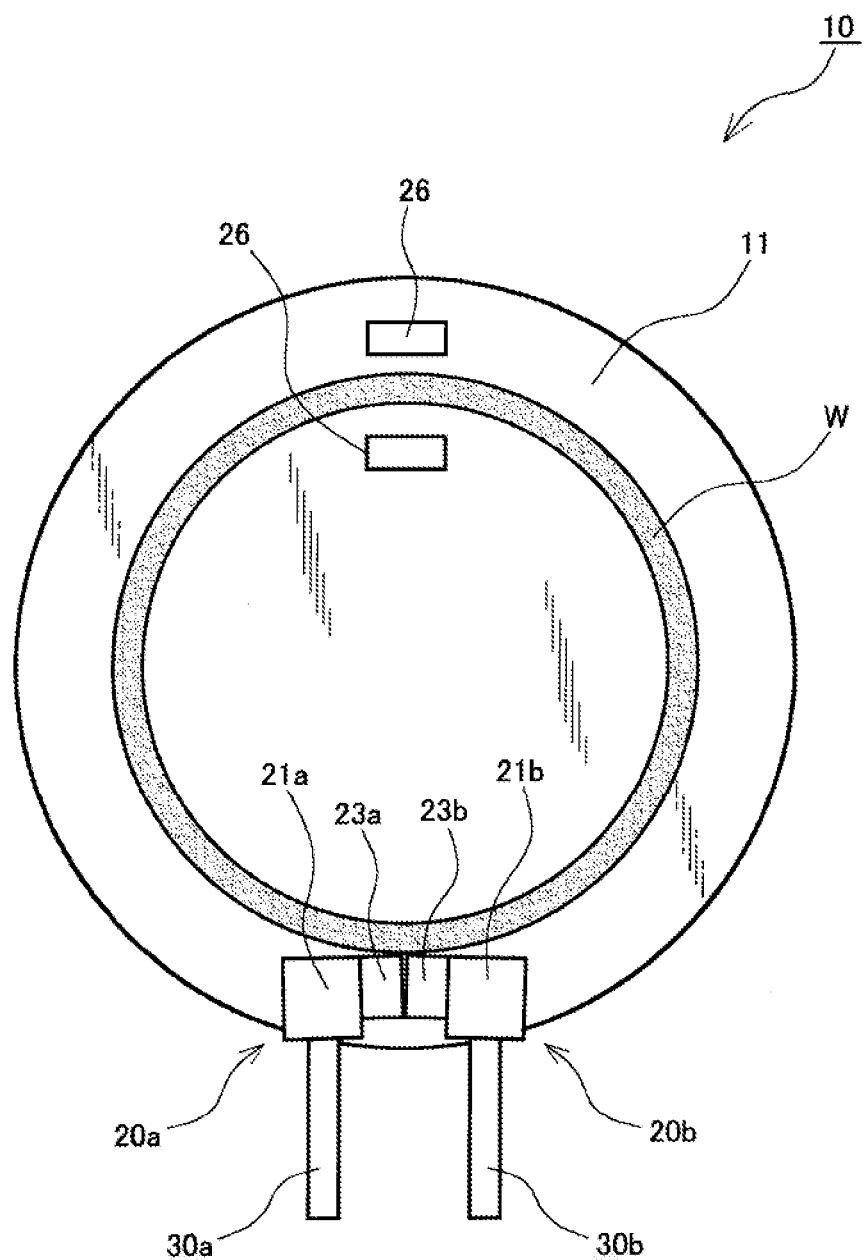

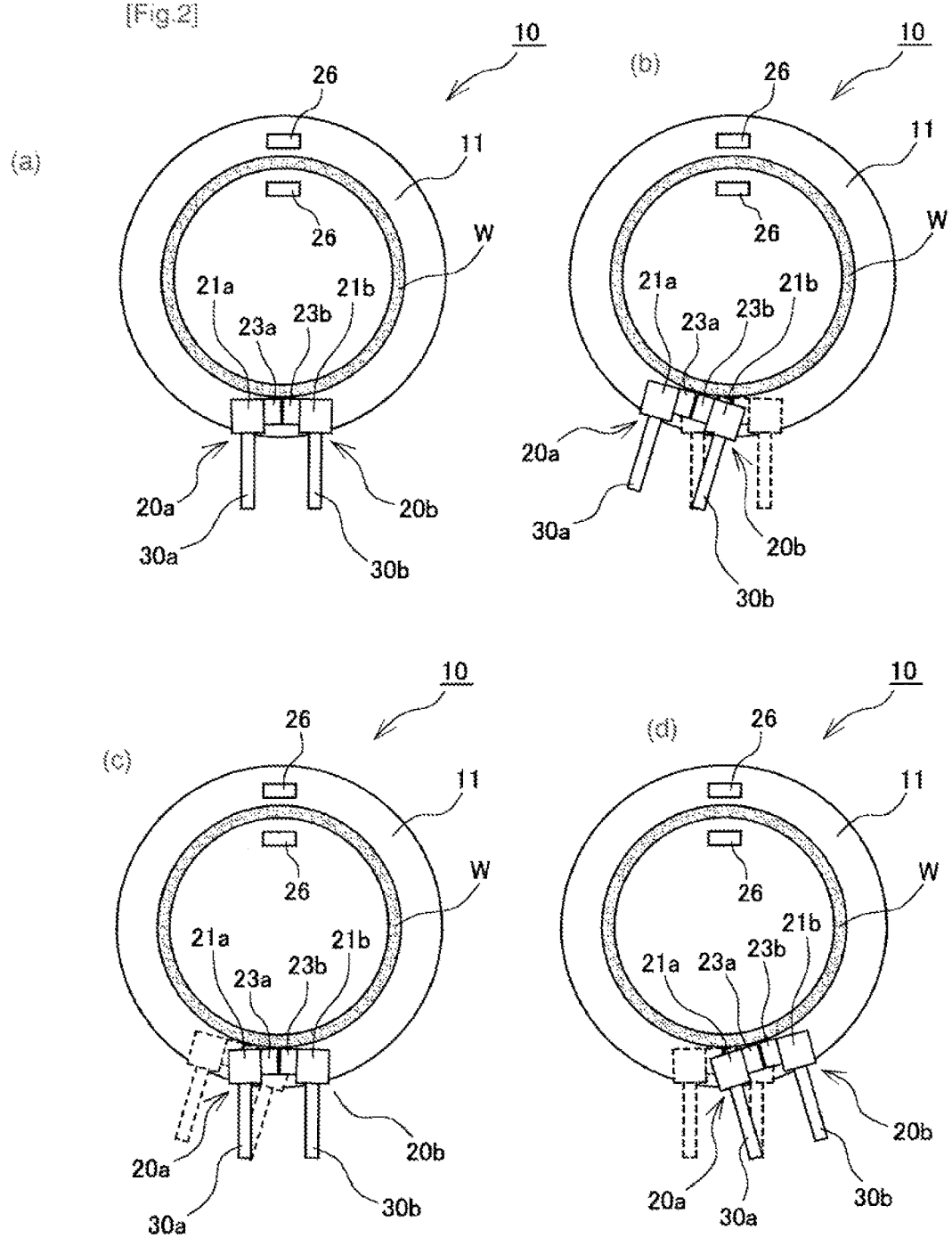

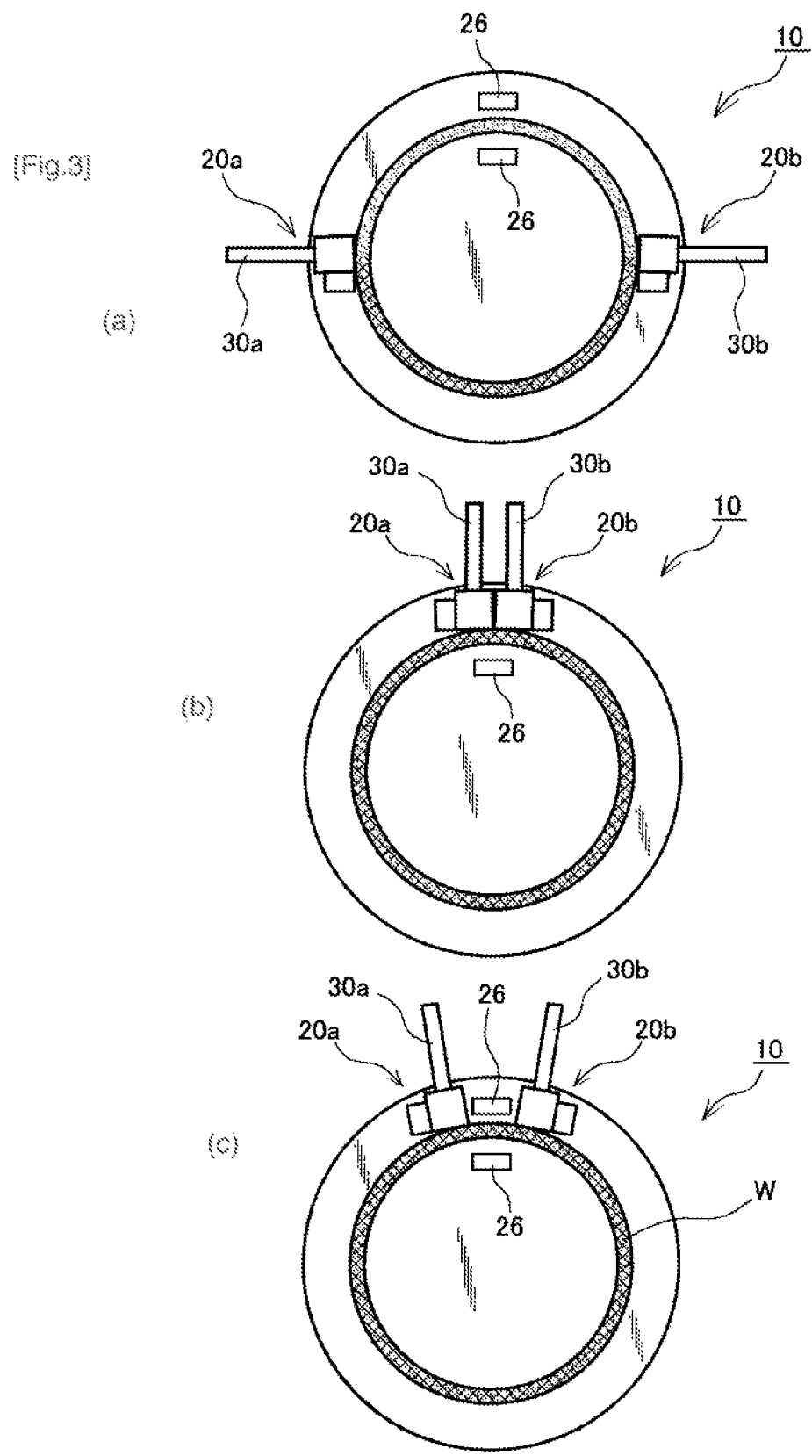

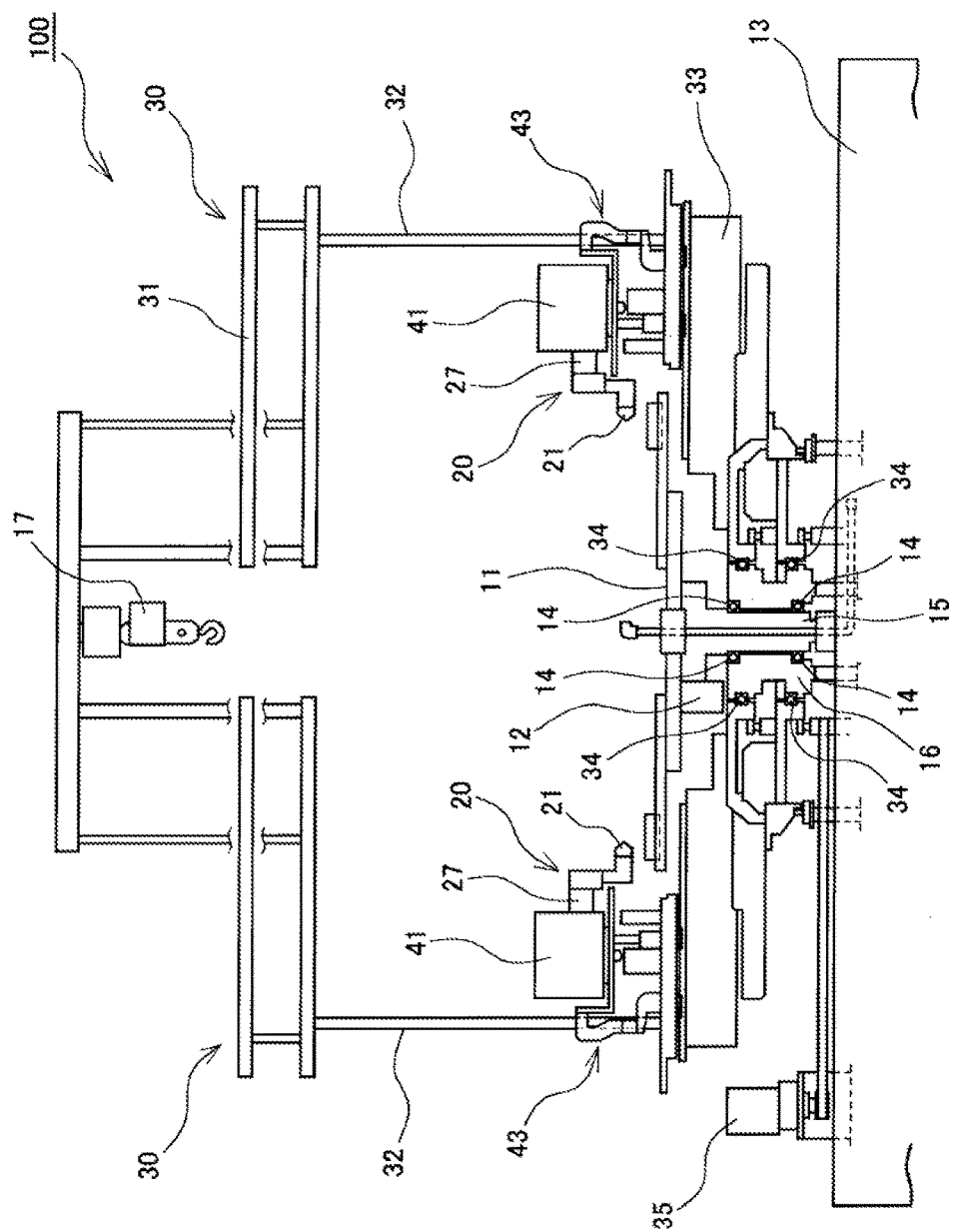

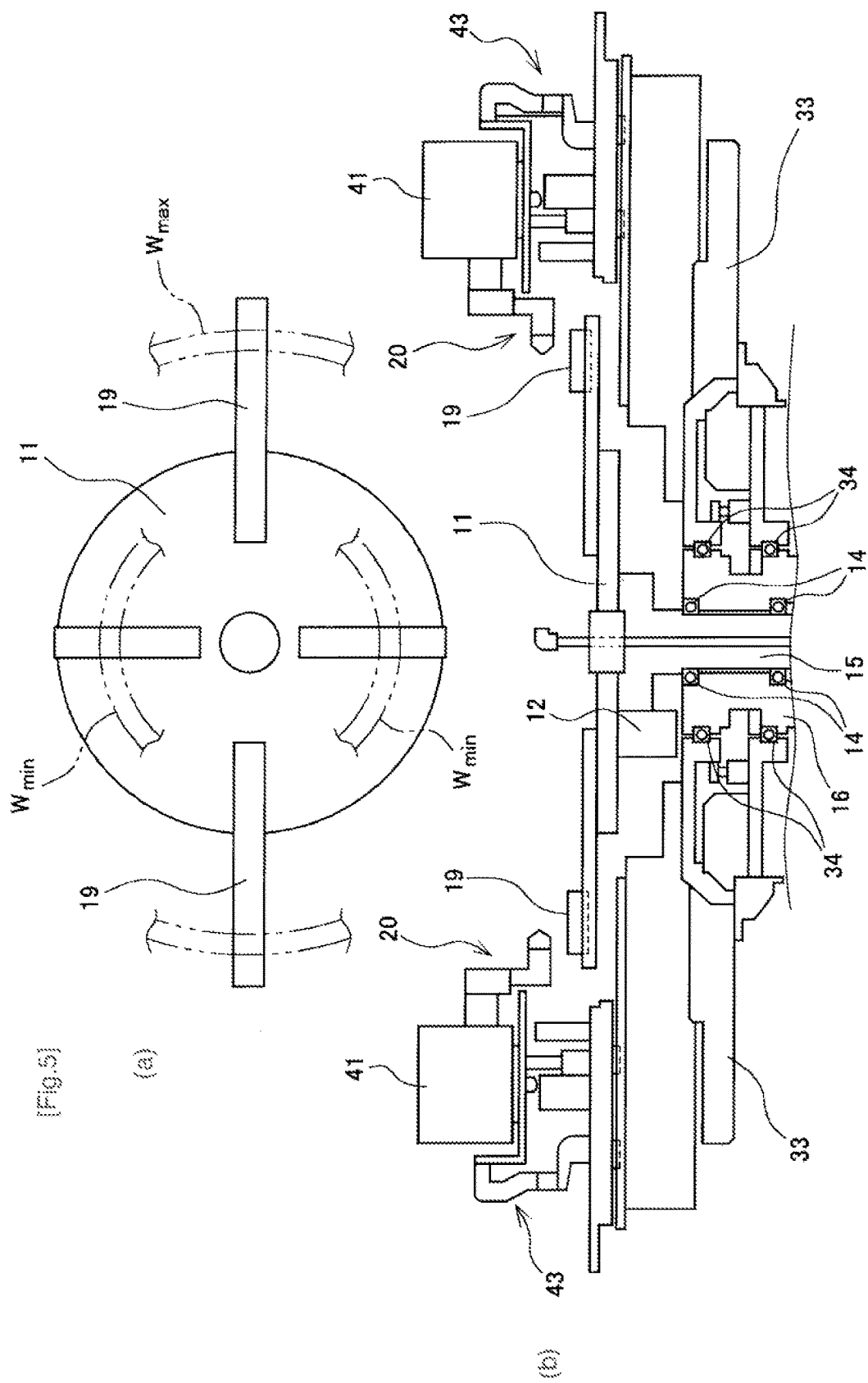

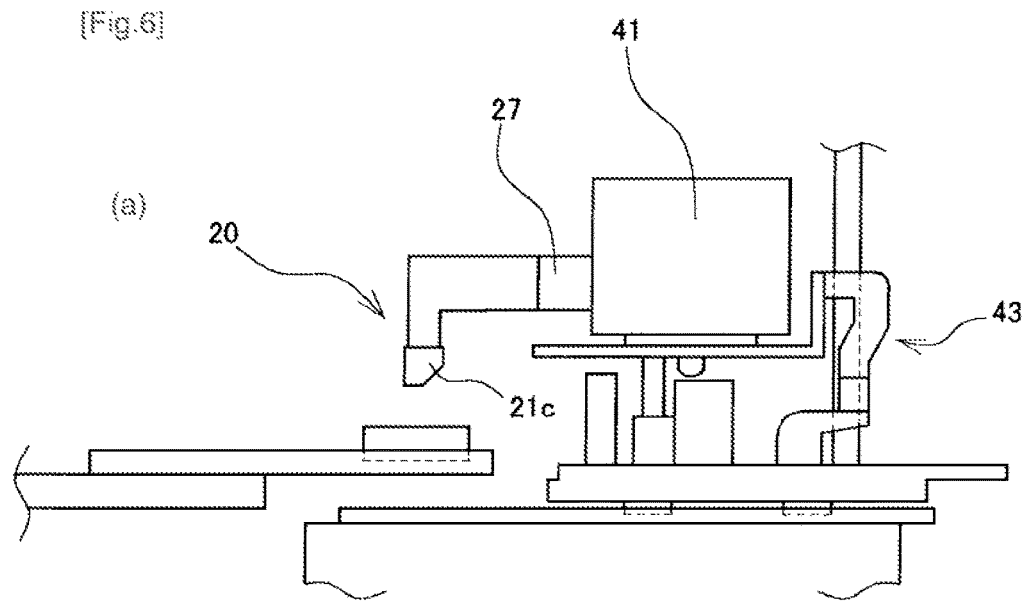
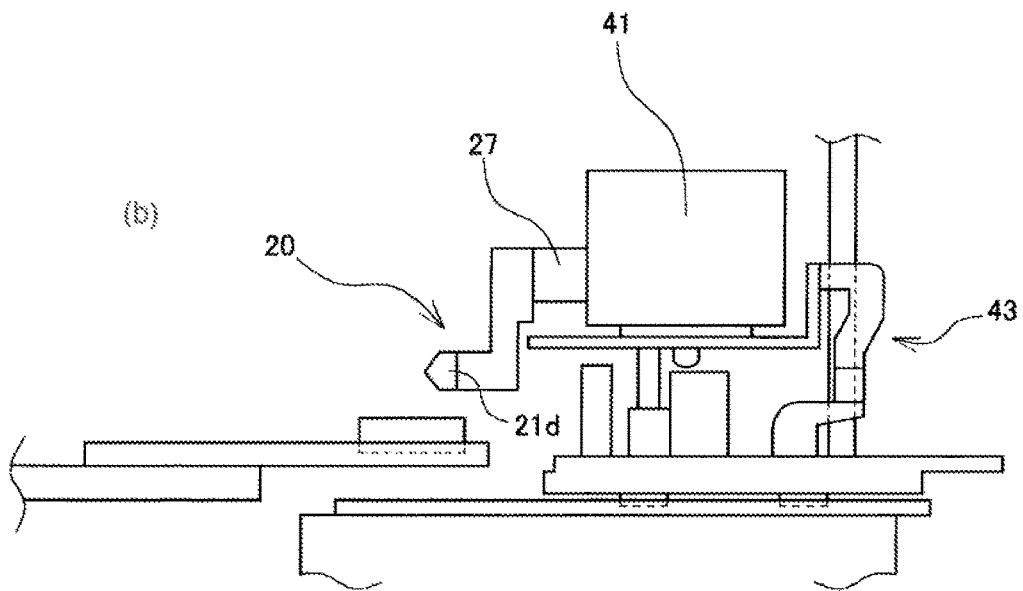

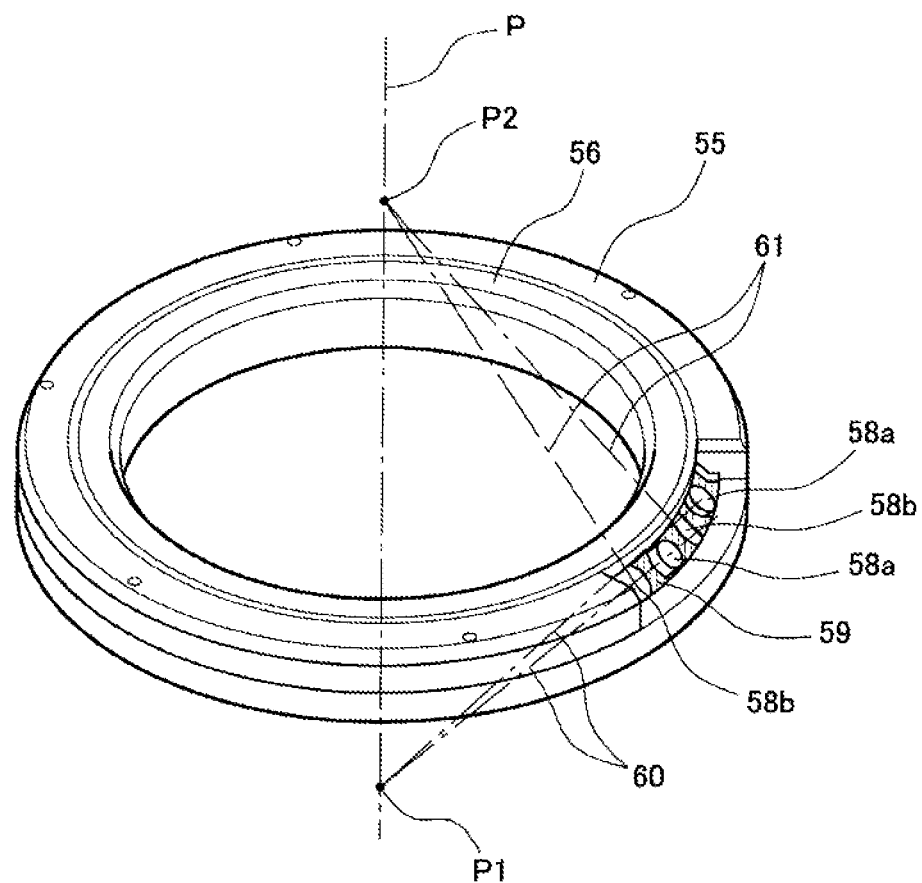

[Fig.8]
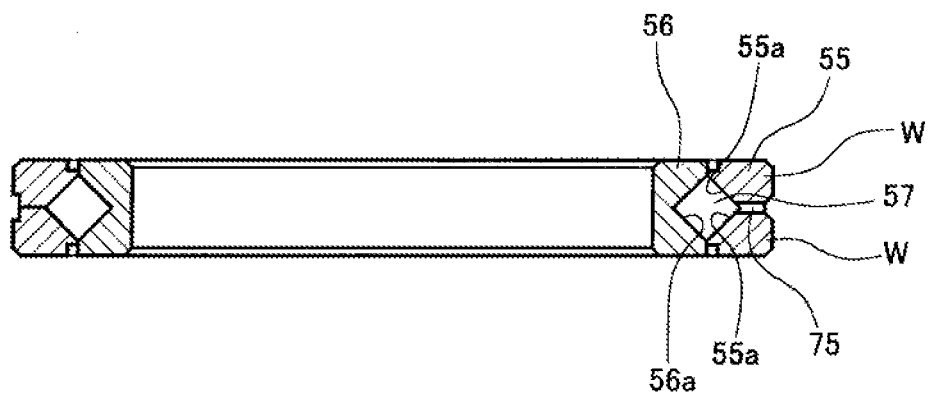

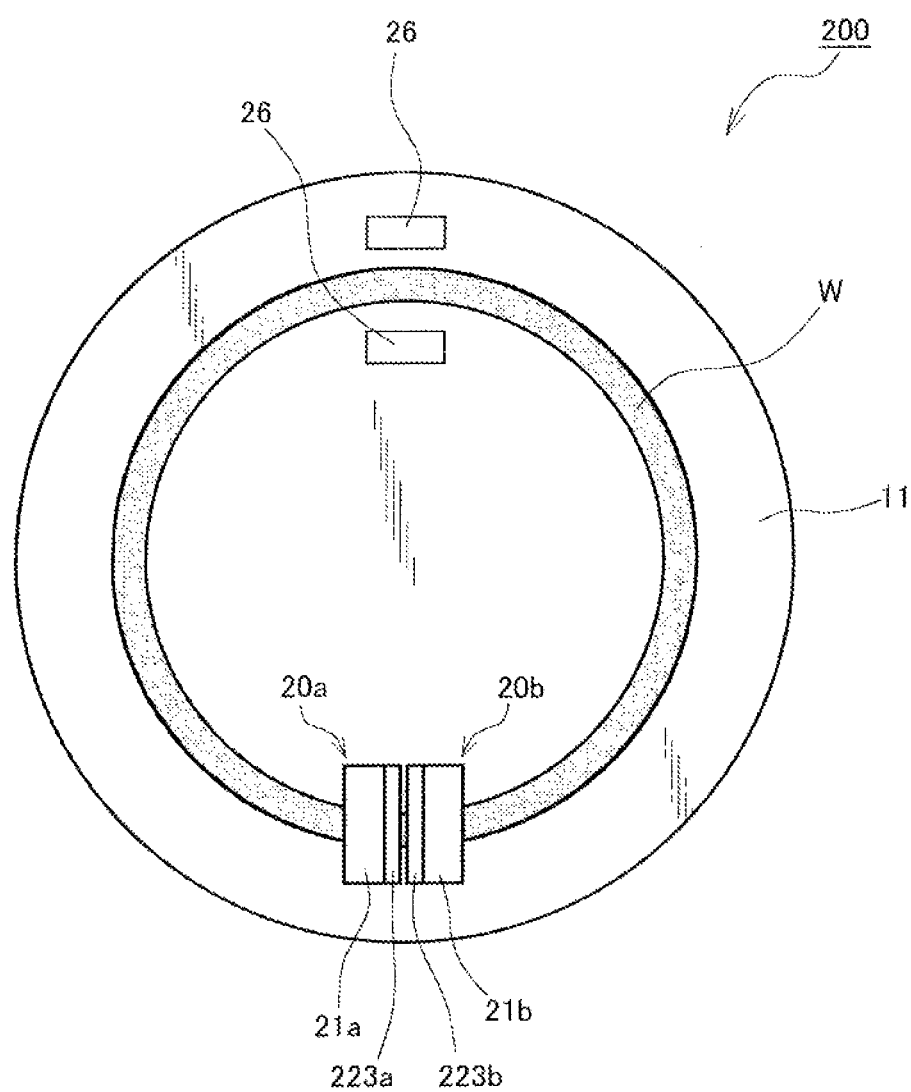
[Fig.9]

[Fig. 10]
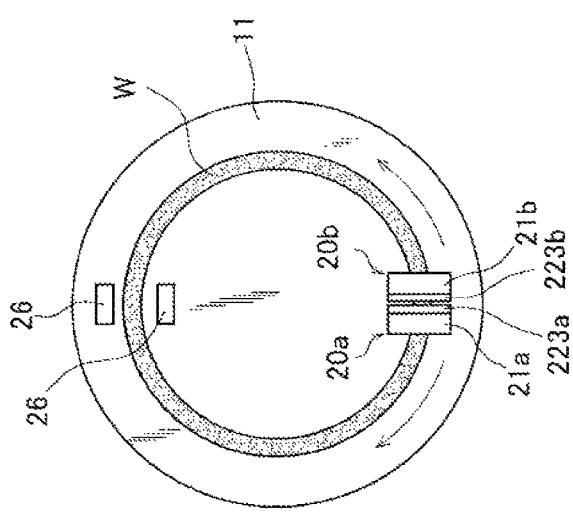
(a)
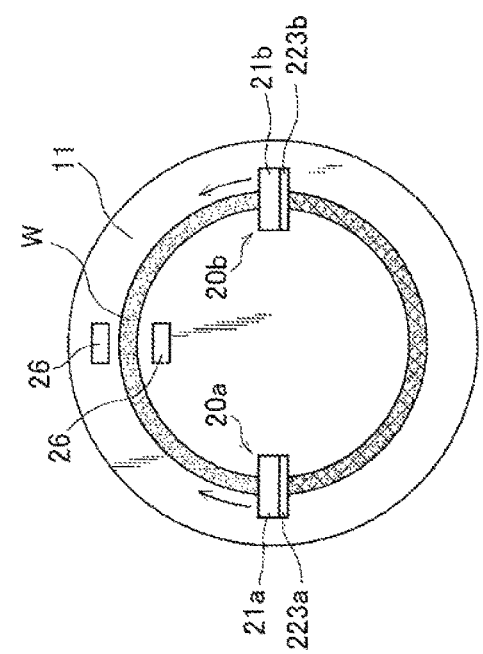
(b)
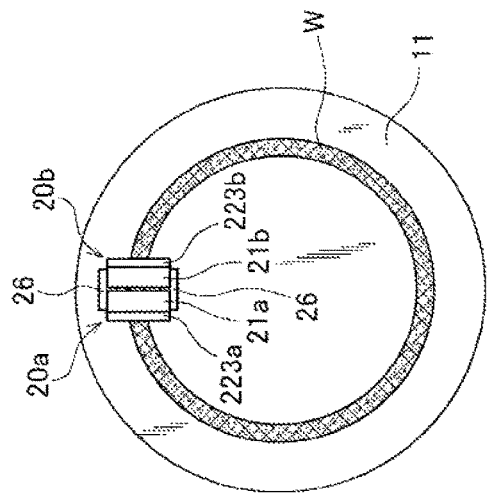
(c)
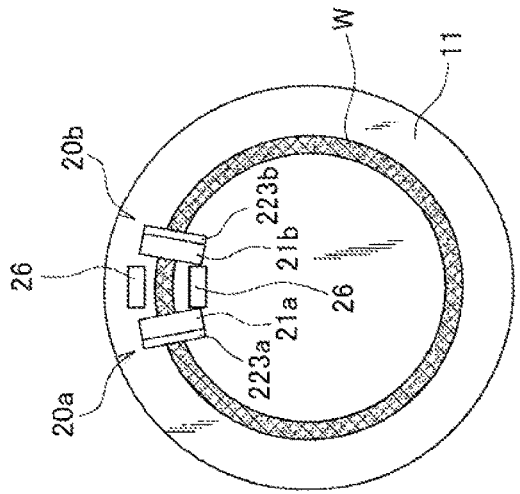
(d)

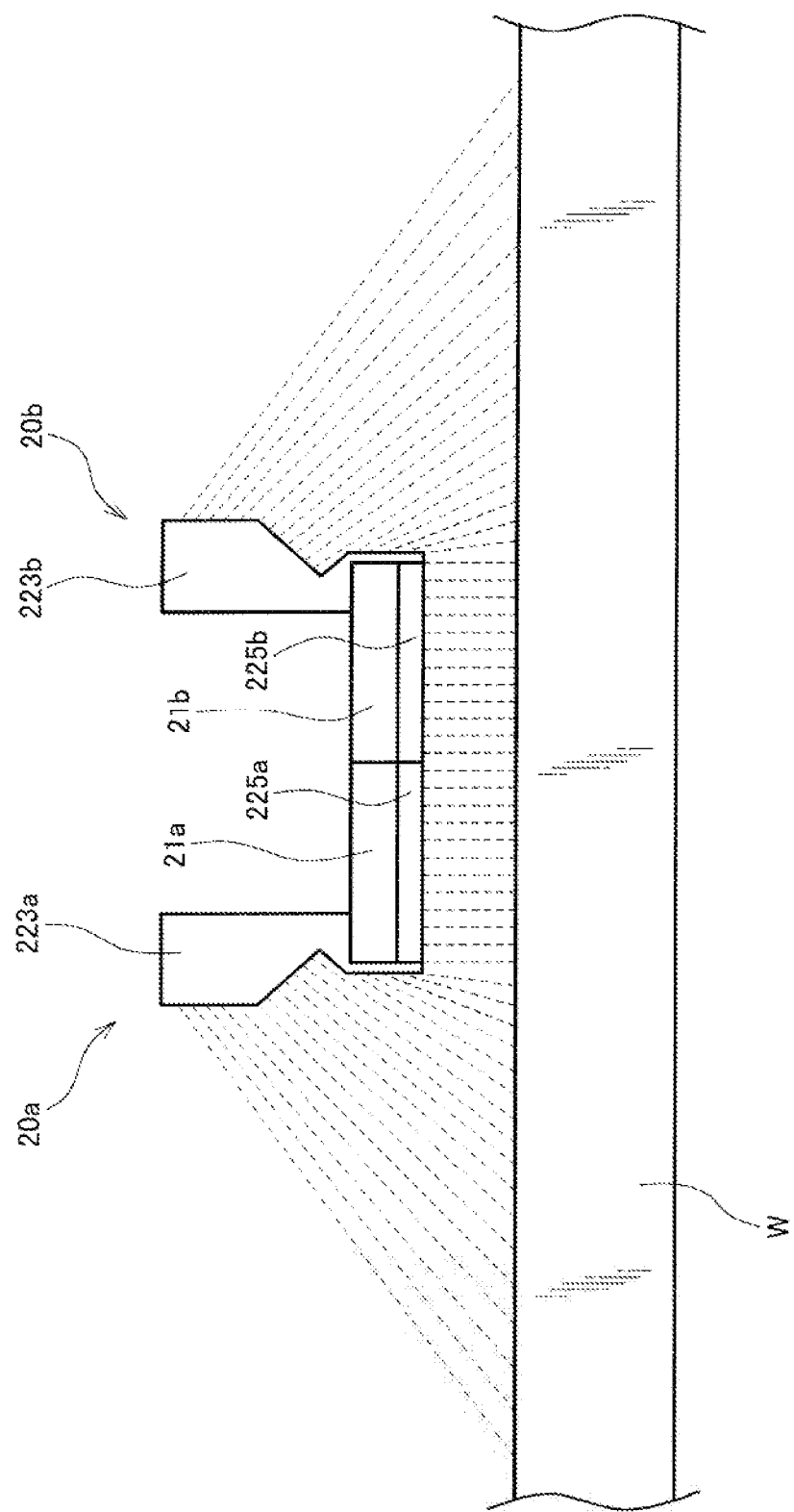

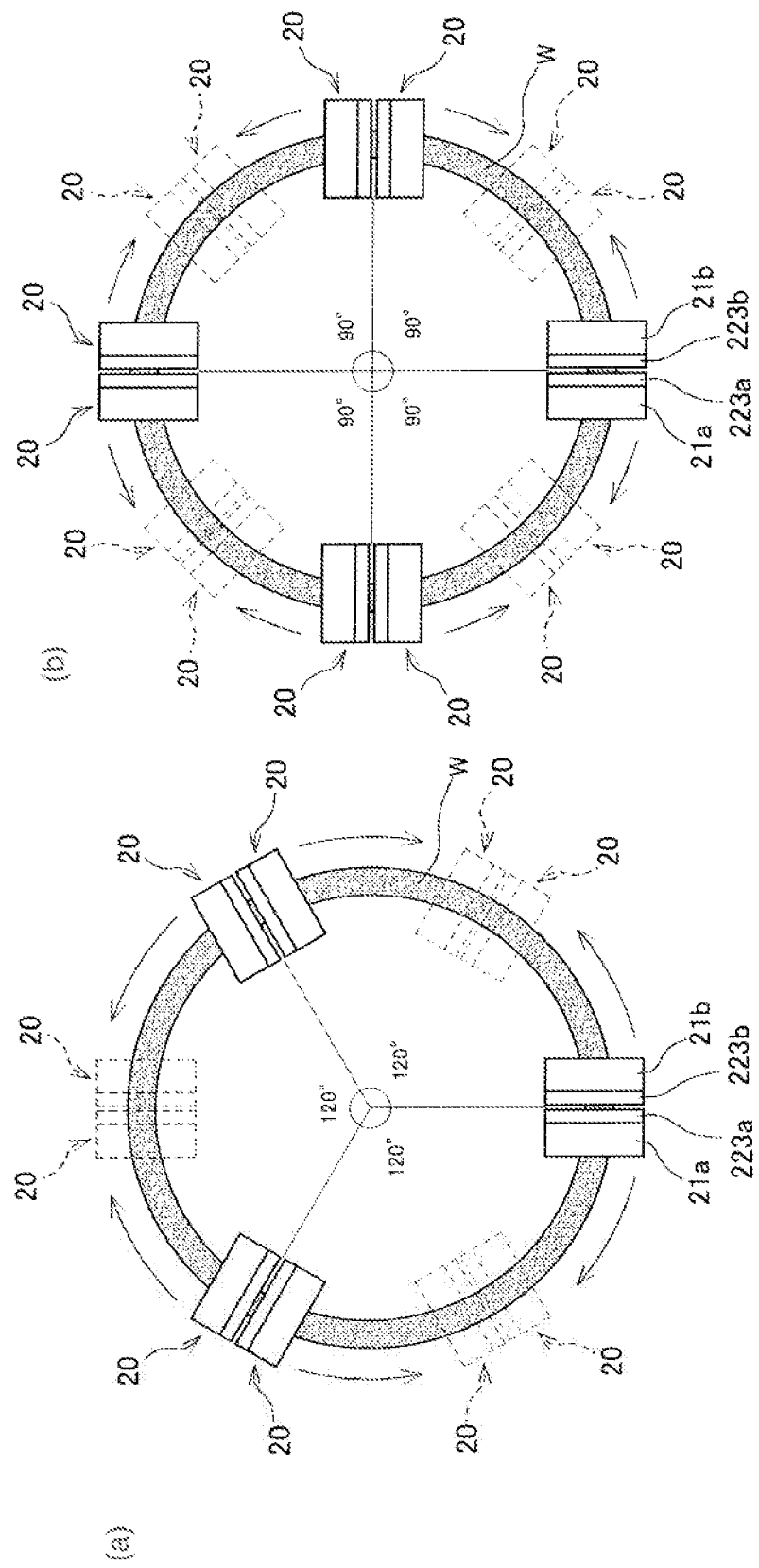

HEAT-TREATMENT DEVICE AND HEAT-TREATMENT METHOD

TECHNICAL FIELD

The present invention relates to a heat-treatment device and a heat-treatment method for heat-processing the entire circumference of the peripheral surface of a ring-shaped workpiece.

BACKGROUND ART

Conventionally, a heat-treatment method is known which hardens only a surface layer of a steel material made of an iron-based metal, maintains toughness of the inside of the steel material, and imparts wear resistance and fatigue resistance. Examples of such a surface hardening method include quenching, a carburizing method, and a nitriding method.

As a surface hardening method for a ring-shaped member made of a steel material, quenching using a heating coil is used, for example. Specifically, a quenching device is known which heats a ring-shaped member using one or two heating coils, and then cools and quenches the ring-shaped member. For example, in the following Patent Literature 1, a high-frequency quenching device is disclosed which forms a uniform quench-hardened layer over the entire circumference of the peripheral groove of a workpiece by heating a portion to be heated of the workpiece using two high-frequency induction heating coils and cooling the portion. In addition, for example, in Patent Literature 2, a high-frequency quenching method is disclosed which heats the outer circumference of a ring workpiece using two or more (even number) movable high-frequency inductors, cools the ring workpiece by jetting a cooling liquid through coolant jetting holes provided at the high-frequency inductors, and thus quenches the ring workpiece.

CITATION LIST

Patent Literature

Patent Literature 1: JP 2010-212672 A
Patent Literature 2: JP Shou 36-505 B

DISCLOSURE OF THE INVENTION

Problems to be Solved by the Invention

Incidentally, in order to quench a workpiece as a material to be processed, it is necessary to transform the structure of the workpiece from austenite to martensite by heating the workpiece to a temperature higher than or equal to a temperature at which the workpiece is austenitized, and then cooling the workpiece so that the workpiece is cooled to a temperature lower than or equal to a martensite start (Ms) point temperature in an austenitized state.

Therefore, in a case where a workpiece is not heated to a temperature higher than or equal to the temperature at which a workpiece is austenitized, it is not possible to quench the workpiece. In addition, in a case where the workpiece is not properly cooled after the workpiece is once heated to a temperature higher than or equal to the temperature at which the workpiece is austenitized, it is not possible to quench the workpiece. Furthermore, if the workpiece is reheated after the workpiece is heated and then cooled, that is, after the workpiece is quenched, the workpiece is annealed and the surface layer of the workpiece is softened.

In the high-frequency quenching device described in the above Patent Literature 1, it is considered that two movable cooling jackets for cooling a workpiece heated by the two high-frequency induction heating coils are arranged between the two high-frequency induction heating coils at a position where quenching of a ring-shaped workpiece is initiated. Since the two movable cooling jackets are arranged between the two high-frequency induction heating coils, there is a gap between the two high-frequency induction heating coils at the position where quenching is initiated. Therefore, there is a problem that it is difficult to heat a workpiece to a temperature higher than or equal to a temperature at which the workpiece is austenitized and it is difficult to form a uniform hardened layer.

In addition, for example, as in the heat-treatment, device described in the above Patent Literature 2, when a ring-shaped workpiece is quenched by moving two heating coils in opposite directions, assume that a certain place of the ring-shaped workpiece set to a location where quenching is initiated (hereinafter referred to as "quenching start") and quenching is initiated at the quenching start portion. Then, especially in quenching of a portion of the workpiece at a location where quenching is finished (hereinafter referred to as "quenching finish"), a joint is generated in heat processing. Therefore, there is a problem that it is difficult to form a uniform hardened layer.

The present invention is made in view of the above described problems, and the object of the present invention is to provide a heat-treatment device and a heat-treatment method capable of uniformly heat-processing the entire circumference of the peripheral surface of a ring-shaped workpiece.

Means for Solving the Problems

A heat-treatment device according to the present invention includes: a table on which a ring-shaped workpiece can be placed; and a pair of heat processing units configured to heat-process a peripheral surface of the workpiece, the pair of heat processing units heat-processing the workpiece while moving in opposite directions along the peripheral surface of the workpiece in order to obtain the workpiece having desired properties, the heat-treatment device further includes: a pair of revolving arms configured to be movable relative to the table and to heat-process the peripheral surface of the workpiece by oscillating the pair of heat processing units relative to the workpiece.

In addition, a heat-treatment method according to the present invention includes: heat-processing an entire circumference of a peripheral surface of a workpiece by using a heat-treatment device including a table on which a ring-shaped workpiece can be placed; and a pair of heat processing units configured to heat-process the peripheral surface of the workpiece; and by causing the pair of heat processing units to heat-process the workpiece while moving in opposite directions along the peripheral surface of the workpiece after a pair of revolving arms capable of revolving relative to the table oscillate the pair of heat processing units relative to the workpiece to heat-process the workpiece.

In addition, the heat-treatment device according to the present invention includes a table on which a ring-shaped workpiece can be placed, and a pair of heat processing units configured to heat-process the peripheral surface of the workpiece, and is used for obtaining a workpiece having desired properties by heat-processing the workpiece while the pair of heat processing units move in opposite directions along the peripheral surface of the workpiece. The heat processing unit includes a heating coil capable of being arranged to face the peripheral surface of the workpiece, a first coolant discharge unit configured to be disposed on the heating coil and to discharge a coolant, and a second coolant discharge unit configured to be arranged at a position overlapping with the heating coil and to discharge a coolant. When the pair of heat processing units moves in opposite directions along the peripheral surface of the workpiece, the peripheral surface of the workpiece heated by the heating coil is sequentially cooled by a coolant discharged through the first coolant discharge unit. When the pair of heat processing units moves to positions where they are adjacent to each other, the peripheral surface of the workpiece heated by the heating coil is also cooled by a coolant discharged through the second coolant discharge unit. Therefore, heat processing is performed over the entire circumference of the peripheral surface of the workpiece.

Furthermore, a heat-treatment method according to the present invention includes: obtaining a workpiece having desired properties by using a heat-treatment device including a table on which a ring-shaped workpiece can be placed; a pair of heat processing units configured to heat-process a peripheral surface of the workpiece, a heating coil configured to be capable of being arranged to face the peripheral surface of the workpiece, a first coolant discharge unit configured to be disposed on the heating coil and to discharge a coolant and a second coolant discharge unit configured to be arranged at a position overlapping with the heating coil and to discharge a coolant; and by causing the pair of heat processing units to heat-process the workpiece while moving in opposite directions along the peripheral surface of the workpiece, the method further includes: sequentially cooling the peripheral surface of the workpiece heated by the heating coil by a coolant discharged through the first coolant discharge unit when the pair of heat processing units move in opposite directions along the peripheral surface of the workpiece; and cooling the peripheral surface of the workpiece heated by the heating coil also by a coolant discharged through the second coolant discharge unit when the pair of heat processing units move to positions where they are adjacent to each other, and heat-processing the entire circumference of the peripheral surface of the workpiece.

Effects of the Invention

According to the present invention, it is possible to provide a heat-treatment device and a heat-treatment method for uniformly heat-processing over the entire circumference of a ring-shaped workpiece.

BRIEF DESCRIPTION OF THE DRAWINGS

FIG. 1 is a schematic view illustrating a configuration example of a heat-treatment device according to the present embodiment.

FIGS. 2(a) to 2(d) are schematic views for explaining an operation example of oscillation of the heat-treatment device according to the present embodiment.

FIGS. 3(a) to 3(c) are schematic views for explaining an operation example of heat processing of the heat-treatment device according to the present embodiment.

FIG. 4 is a view illustrating an entire configuration example of a working example of the heat-treatment device according to the present embodiment.

FIGS. 5(a) and 5(b) are schematic views for explaining a table of the working example of the heat-treatment device according to the present embodiment, FIG. 5(a) is a plan view of the table according to the present working example, and FIG. 5(b) is a side view of the table according to the present working example.

FIGS. 6(a) and 6(b) are schematic views for explaining a heating coil of the working example of the heat-treatment device according to the present embodiment.

FIG. 7 is a perspective view including a partial cross-section of a slewing bearing in accordance with an embodiment of the present invention.

FIG. 8 is a cross-sectional view of the slewing bearing in accordance with an embodiment of the present invention.

FIG. 9 is a schematic view illustrating a basic configuration example of the heat-treatment device according to the present embodiment.

FIGS. 10(a) to 10(d) are schematic views illustrating a basic operation example of the heat-treatment device according to the present embodiment, FIG. 10(a) is a schematic view illustrating a quenching start state, FIG. 10(b) is a schematic view illustrating a state between quenching start and quenching finish, and FIGS. 10(c) and 10(d) are schematic views illustrate quenching finish states.

FIG. 11 is a schematic view for explaining a state where a coolant is discharged through a first coolant discharge unit and a second coolant discharge unit at quenching finish of the heat-treatment device according to the present embodiment.

FIGS. 12(a) and 12(b) are schematic views illustrating various configuration examples of the heat-treatment device in accordance with an embodiment of the present invention.

MODE FOR CARRYING OUT THE INVENTION

Hereinafter, an embodiment of the present invention will be described with reference to the drawings. Note that the following embodiment will not limit the aspect of the invention according to each claim, and not all the combinations of the features described in the embodiment is necessary for solution means of the invention.

First, a configuration example of a heat-treatment device 10 according to the present embodiment will be described with reference to FIG. 1. Here, FIG. 1 is a schematic view illustrating a configuration example of the heat-treatment device according to the present embodiment.

As illustrated in FIG. 1, the heat-treatment device 10 according to the present embodiment includes a table 11 on which a ring-shaped workpiece W can be placed, and a pair of heat processing units 20 (20a, 20b) configured to heat-process the peripheral surface of workpiece W, and a pair of revolving arms 30 (30a, 30b) movable relative to the table 11.

A workpiece W is a material to be processed subjected to heat processing. Examples of the workpiece W according to the present embodiment include an outer ring and an inner ring constituting a slewing bearing and the workpiece W has an approximately rectangular or trapezoidal shape provided with a notch of an approximately dogleg shape (approximately inclined L shape) in cross-sectional view. In addition, in the workpiece W, heat processing can be performed on a rolling element rolling surface of the slewing bearing, for example.

The table 11 is formed into an approximately circular shape in plan view, and the workpiece W can be placed thereon. It is possible to perform heat processing by placing the workpiece W on the table 11 by means of a crane 17, described later, and fixing the workpiece W. The table 11 is configured to be rotatable with the center of the table 11 as a rotation center-axis.

The heat processing unit 20 (20a, 20b) is configured to heat-process the peripheral surface of the workpiece W and is configured by including heating coils 21 (21a, 21b) to heat the workpiece W, and coolant discharge units 23 (23a, 23b) to cool the workpiece W. The heat processing unit 20 is arranged on the revolving arm 30 movable relative to the table 11 and is capable of heat-processing the peripheral surface of the workpiece W.

The heating coil 21 is configured to be arranged to be capable of facing the peripheral surface of the workpiece W. The heating coil 21 can heat the peripheral surface of the workpiece W. In the heat-treatment device 10 according to the present embodiment, the heating coil 21 is configured to be arranged on the revolving arm 30, described later.

The coolant discharge unit 23 is disposed on the heating coil 21 and is capable of discharging a coolant. For example, a plurality of holes may be opened on a side surface of the coolant discharge unit 23 on the side opposite to the side surface of the coolant discharge unit 23 where the heating coil 21 is disposed, and a coolant may be discharged through the holes. In addition, a plurality of holes may be opened on the surface of the coolant discharge unit 23 facing the workpiece W and a coolant may be discharged through the holes. Furthermore, a plurality of holes may be opened on both the side surface of the coolant discharge unit 23 and the surface of the coolant discharge unit 23 facing the workpiece W.

The revolving arm 30 is configured to be movable relative to the table 11, and the heat processing unit 20 may be arranged on the revolving arm 30. In the heat-treatment device 10 according to the present embodiment, the heating coil 21 is arranged on the revolving arm 30. The revolving arm 30 enables the heat processing unit 20 to move along the peripheral surface of the ring-shaped workpiece W and to heat-process the peripheral surface of the workpiece W. In addition, the pair of revolving arms 30 is configured to be able to oscillate relative to the workpiece W.

Furthermore, as illustrated in FIG. 1, in the heat-treatment device 10 according to the present embodiment, a cooling device 26 configured to cool the workpiece W after retracting the heat processing unit 20 from a quenching finish spot of the workpiece W is arranged and fixed at the quenching finish spot of the workpiece W on the table 11. For example, the cooling device 26 may be arranged to face the workpiece W processed to be an outer ring or an inner ring of a slewing bearing, and may be configured to discharge a coolant through a plurality of holes opened on a surface facing the workpiece W.

A configuration example of the heat-treatment device 10 according to the present embodiment has been described as above. Next, an operation example of the heat-treatment device 10 according to the present embodiment will be described with reference to FIGS. 1(a) to 3(c). Here, FIGS. 2(a) to 2(d) are schematic views for explaining an operation example of oscillation of the heat-treatment device according to the present embodiment. FIGS. 3(a) to 3(c) are schematic views for explaining an operation example of heat processing of the heat-treatment device according to the present embodiment. Note that a cross-hatched portion in FIGS. 3(a) to 3(c) indicates a portion of the workpiece W having been subjected to heat processing by the heat-treatment device 10 according to the present embodiment.

In the heat-treatment device 10 according to the present embodiment, when heat processing is initiated, the pair of heat processing units 20 (20a, 20b) are arranged to be adjacent to each other as illustrated in FIG. 2(a).

In the heat-treatment device 10 according to the present embodiment, since the coolant discharge units 23 (23a, 23b) are arranged between the pair of heating coils 21 (21a, 21b), the portion of the peripheral surface of the workpiece W facing the coolant discharge units 23 (23a, 23b) is difficult to be heated by the heating coils 21 (21a, 21b) separated by the widths of the coolant discharge units 23 (23a, 23b). In addition, the portion is not sufficiently heated only by thermal conduction in the heated workpiece W.

In view of the foregoing, the heat-treatment device 10 according to the present embodiment performs heat processing by oscillating the pair of revolving arms 30 (30a, 30b) relative to the workpiece W and thereby sufficiently heating the periphery of the heat-processing start position. Hereinafter, specific steps of a heat-treatment method using the heat-treatment device 10 according to the present embodiment will be described.

When the pair of heat processing units 20 (20a, 20b) initiate heat processing on the workpiece W, the pair of heat processing units 20 (20a, 20b) and the pair of revolving arms 30 (30a, 30b) illustrated in FIG. 2(a) are oscillated in the right-and-left direction in the figure, and thus it is possible to heat the peripheral surface of the workpiece W to a temperature higher than or equal to the temperature at which the workpiece W is austenitized.

The pair of heat processing units 20 (20a, 20b) and the pair of revolving arms 30 (30a, 30b) illustrated in FIG. 2(a), that is, the pair of heat processing units 20 (20a, 20b) and the pair of revolving arms 30 (30a, 30b) depicted by broken lines in FIG. 2(b) are oscillated in the left direction in the figure, and become a state depicted by solid lines in FIG. 2(b), which allows the portion of the peripheral surface of the workpiece W facing the coolant discharge unite (23a, 23b) included in the pair of heat processing units 20 (20a, 20b) depicted by the broken lines in FIG. 2(b) to be heated by the heating coil 21b included in the heat processing unit 20b on the right side in the figure.

Next, the pair of heat processing units 20 (20a, 20b) and the pair of revolving arms 30 (30a, 30b) having been oscillated in the left direction in the figure, depicted by the solid lines in FIG. 2(b), that is, the pair of heat processing units 20 (20a, 20b) and the pair of revolving arms 30 (30a, 30d) depicted by broken lines in FIG. 2(c) are oscillated in the right direction in the figure, and become a state depicted by solid lines in FIG. 2(c).

Then, the pair of heat processing units 20 (20a, 20b) and the pair of revolving arms 30 (30a, 30b) having been oscillated in the right direction in the figure, depicted by the solid lines in FIG. 2(c), that is, the pair of heat processing units 20 (20a, 20b) and the pair of revolving arms 30 (30a, 30b) depicted by broken lines in FIG. 2(d) are oscillated in the right direction in the figure, and become a state depicted by solid lines in FIG. 2(d), which allows the portion of the peripheral surface of the workpiece W facing the coolant discharge units 23 (23a, 23b) included in the pair of heat processing units 20 (20a, 20b) illustrated in FIG. 2(d) to be heated by the heating coil 21a included in the heat processing unit 20a on the left side in the figure.

That is, the pair of heat processing units 20 (20a, 20b) and the pair of revolving arms 30 (30a, 30b) are oscillated in the left direction in the figure and then are oscillated in the right direction in the figure (see FIG. 2(a)→FIG. 2(b)→FIG. 2(c)→FIG. 2(d)). Note that the oscillation-start direction of the pair of heat processing units 20 (20a, 20b) may be either the right or left direction. That is, the pair of heat processing units 20 (20*a*, 20*b*) and the pair of revolving arms 30 (30*a*, 30*b*) may be oscillated in the right direction in the figure and then may be oscillated in the left direction in the figure (in that case, see FIG. 2(*a*)→FIG. 2(*d*)→FIG. 2(*c*)→FIG. 2(*b*)).

As described, by oscillating the pair of heat processing units 20 (20*a*, 20*b*) and the pair of revolving arms 30 (30*a*, 30*b*) in the right-and-left direction, it is possible to heat the workpiece W appropriately for quenching at a heat-processing start position, and therefore, it is possible to uniformly heat-process the entire circumference of the peripheral surface of the workpiece W.

In addition, as can be seen from FIGS. 2(*a*) to 2(*d*), the pair of heat processing units 20 (20*a*, 20*b*) oscillate while sandwiching the pair of coolant discharge units 23 (23*a*, 23*b*) between the pair of heating coils 21 (21*a*, 21*b*). Due to such a configuration, it is possible to heat the workpiece W appropriately for quenching at the heat-processing start position, and therefore, it is possible to uniformly heat-process the entire circumference of the peripheral surface of the workpiece W.

Note that the number of oscillations of the pair of heat processing units 20 (20*a*, 20*b*) and the pair of revolving arms 30 (30*a*, 30*b*) in the right-and-left direction in the figure and the oscillation range thereof may be any and may be appropriately changed as long as the workpiece W located at the heat-processing start position is heated to a temperature higher than or equal to the temperature at which the workpiece W is austenitized and the workpiece W having desired properties can be obtained.

In addition, it is also possible to rotate the table 11 about the rotation center axis of the table 11 and rotate the table 11 reversely at a predetermined position, thereby oscillating the workpiece W placed on the table 11 and to cause the heating coils 21 (21*a*, 21*b*) in a fixed state included in the pair of heat processing units 20 (20*a*, 20*b*) to heat the portion of the peripheral surface of the workpiece W facing the coolant discharge units 23 (23*a*, 23*b*) at the start position to a temperature higher than or equal to the temperature at which the workpiece W is austenitized. Furthermore, the workpiece W placed on the table may foe heated by oscillating the pair of heat processing units 20 (20*a*, 20*b*) and the pair of revolving arms 30 (30*a*, 30*b*) and by oscillating the table 11.

Then, after the pair of revolving arms 30 (30*a*, 30*b*) are oscillated relative to the workpiece W and the portion of the peripheral surface of the workpiece W facing the coolant discharge units 23 (23*a*, 23*b*) is heated by the heating coils 21 (21*a*, 21*b*) to a temperature higher than or equal to the temperature at which the workpiece W is austenitized, the pair of heat processing units 20 (20*a*, 20*b*) quench the workpiece W while moving in opposite directions along the peripheral surface of the workpiece W.

The heat processing unit 20*a* on the left side in the figure is configured so that the heating coil 21*a* included in the heat processing unit 20*a* heats the workpiece W while the heat processing unit 20*a* moves in the upper-left direction in the figure along the peripheral surface of the workpiece W. Then, the workpiece W heated by the heating coil 21*a* is sequentially cooled by the coolant discharge unit 23*a*. In more detail, the heating coil 21*a* heats the portion of the peripheral surface of the workpiece W facing the heat processing unit 20*a* while the heat processing unit 20*a* revolves toward the upper-left in the figure, then the coolant discharge unit 23*a* discharges a coolant to the heated workpiece W, and therefore the workpiece W is cooled and is heat-processed (quenched).

In the same manner as in the case of the heat processing unit 20*a* on the left side in the figure, the heat processing unit 20*b* on the right side in the figure is configured so that the heating coil 21*b* included in the heat processing unit 20*b* heats the workpiece W while the heat processing unit 20*b* moves in the upper-right direction in the figure along the peripheral surface of the workpiece W, and the coolant discharge unit 23*b* sequentially cools the heated workpiece W. In more detail, the heating coil 21*b* heats the portion of the peripheral surface of the workpiece W facing the heat processing unit 20*b* while the heat processing unit 20*b* revolves toward the upper-right in the figure, then the coolant discharge unit 23*b* discharges a coolant to the heated workpiece W, and therefore the workpiece W is cooled and is heat-processed (quenched).

Through the above-described operation, the pair of heat processing units 20 (20*a*, 20*b*) heat-process (quench) the entire circumference of the peripheral surface of the workpiece W.

Then, as illustrated in FIG. 3(*a*), when the pair of heat processing units 20 (20*a*, 20*b*) move to approximately intermediate positions between the quenching start position and the quenching finish position, approximately half of the workpiece W has been heat-processed (quenched).

In the heat-treatment device 10 illustrated in FIG. 3(*a*), the heat processing unit 20*a* on the left side in the figure heats the peripheral surface of the workpiece W by means of the heating coil 21*a* included in the heat processing unit 20*a* while revolving toward the upper-right in the figure along the peripheral face of the workpiece W. The heated workpiece W is sequentially cooled by a coolant discharged from the coolant discharge unit 23*a* revolving following the heating coil 21*a*.

In addition, the heat processing unit 20*b* on the right side in the figure heats the peripheral surface of the workpiece W by means of the heating coil 21*b* included in the heat processing unit 20*b* while revolving toward the upper-left in the figure along the peripheral surface of the workpiece W. The heated workpiece W is sequentially cooled by a coolant discharged from the coolant discharge unit 23*b* revolving following the heat processing unit 20*b*.

By performing heat processing as described above, the pair of heat processing units 20 (20*a*, 20*b*) move to positions adjacent to each other as illustrated in FIG. 3(*b*).

The pair of heat processing units 20 (20*a*, 20*b*) have such a configuration that the pair of heat processing units 20 (20*a*, 20*b*) revolve while slowing down the moving speed thereof when approaching a position where quenching is finished, and thus it is possible to heat the portion of the workpiece W where quenching is finished by thermal conduction.

After the portion where quenching is finished is heated by thermal conduction, as illustrated in FIG. 3(*c*), the pair of heat processing units 20 (20*a*, 20*b*) retract from the quenching finish spot, and the workpiece W is cooled by the cooling device 26 fixed and arranged at the quenching finish spot. Thus, the entire circumference of the peripheral surface of the workpiece W is subjected to heat processing (quenching). Note that the pair of heat processing units 20 (20*a*, 20*b*) may be retracted from the quenching finish spot by moving the pair of heat processing units 20 (20*a*, 20*b*) in the direction opposite to the moving direction of the pair of heat processing units 20 (20*a*, 20*b*) when performing heat processing.

Therefore, according to the heat-treatment device 10 according to the present embodiment, it is possible to heat the workpiece W appropriately for quenching at the heat-processing start position, and the entire circumference of the peripheral surface of the workpiece W is heat-processed. As a result, it is possible to obtain the ring-shaped workpiece W formed with a uniform hardened layer over the entire circumference.

An operation example of the heat-treatment device 10 according to the present embodiment has been described above. Next, an entire configuration example of a working example of the heat-treatment device 10 according to the present embodiment will be described with reference to FIGS. 4 to 6(b). Here, FIG. 4 is a view illustrating the entire configuration example of the working example of the heat-treatment device according to the present embodiment. FIGS. 5(a) and 5(b) are schematic views for explaining a table of the working example of the heat-treatment device according to the present embodiment. FIG. 5(a) is a plan view of the table of the heat-treatment device according to the present working example. FIG. 5(b) is a side view of the table of the heat-treatment device according to the present working example. FIGS. 6(a) and 6(b) are schematic views for explaining a heating coil of the working example of the heat-treatment device according to the present embodiment.

Working Example

As illustrated in FIG. 4, a heat-treatment device 100 according to the present working example is configured by including a base 13 serving as a base for the table 11 and the like, a rotating unit 15 configured to rotate the table 11, and the table 11 placed on the rotating unit 15, and the pair of revolving arms 30 capable of revolving relative to the table 11, and the pair of heat processing units 20 arranged on the pair of revolving arms 30, respectively.

The base 13 serves as a base for the heat-treatment device 100 according to the present working example. The rotating unit 15 is arranged on the base 13.

As illustrated in FIGS. 4 and 5(b), the rotating unit 15 is provided to be erected inside a fixed casing 16 via a bearing 14. As illustrated in FIG. 4, the rotating unit 15 is gear-connected to a motor 12, and thus can be rotated by power transmission from the motor 12. As illustrated in in FIGS. 4 and 5(b), the table 11 is fixed and arranged on the upper side of the rotating unit 15, and the rotation center axis of the rotating unit 15 and the center of the table 11 are coaxial. Therefore, when the rotating unit 15 is rotated by power transmission from the motor 12, the table 11 arranged on the upper side of the rotating unit 15 rotates. Due to the above configuration, the table 11 and a workpiece W placed on the table 11 oscillate as a movable side, and it is possible to heat the workpiece W appropriately for quenching at the heat-processing start position, and to uniformly heat-process the entire circumference of the peripheral surface of the workpiece W.

A bearing 34 is arranged on an outer circumferential side of the fixed casing 16, and a lower arm 33 of the revolving arm 30, described later, is connected to the outer circumferential side of the fixed casing 16 via the bearing 34.

As illustrated in FIG. 5(a), the table 11 has an approximately circular shape in plan view, a clamping mechanism 19 configured to attach the workpiece W is arranged on the table 11, and the workpiece W can be attached to the table 11 by means of the clamping mechanism 19.

The clamping mechanism 19 is configured to be capable of extending and contracting depending on the diameter and the like of the ring-shaped workpiece W. As illustrated in FIG. 5(a), the clamping mechanism 19 corresponds to workpieces ranging from, for example, a workpiece Wmin with the minimal diameter 1500 mm to a workpiece Wmax with the maximal diameter 3100 mm, and is configured to place and fix the workpiece Wmin or the workpiece Wmax on the table 11 and to heat-process the workpiece.

An electric crane 17 may be used for placing the workpiece W on the table 11 and fixing the workpiece W thereon by means of the clamping mechanism 19. The crane 17 according to the present working example is configured by being hooked on an I-section steel. Here, the crane 17 may be any crane as long as capable of moving the workpiece W in the horizontal direction and the vertical direction.

The revolving arm 30 can revolve relative to the table 11. The revolving arm 30 is connected to a motor 35 via a timing belt and the like and thus can be rotated by power transmission from the motor 35. The heat processing unit 20 is arranged on the lower arm 33 configuring the lower side of the revolving arm 30 via a transformer 41, and the like. When the revolving arm 30 revolves relative to the table 11, the heat processing unit 20 arranged on the lower arm 33 included in the revolving arm 30 revolves. Therefore, the revolving arm 30 allows the heat processing unit 20 to move along the peripheral surface of the ring-shaped workpiece W and to heat-process the peripheral surface of the workpiece W.

As illustrated in FIG. 4, the revolving arm 30 includes an upper arm 31 configuring the upper side of the revolving arm 30, a vertical arm 32 arranged to approximately vertically contact the upper arm 31, and the lower arm 33. The exterior of the revolving arm 30 has an approximately inclined horseshoe-shape (approximately inclined U shape) in side view.

As illustrated in FIG. 4, the lower arm 33 is connected to the fixed casing 16 via the bearing 34 in a manner capable of revolving. The revolving arm 30 including the lower arm 33 can rotate independently of the rotating unit 15 (that is, the table 11). That is, even when the rotating unit 15 rotates, the revolving arm 30 including the lower arm 33 can be stopped. In addition, even when the rotating unit 15 does not rotate, the revolving arm 30 including the lower arm 33 can rotate. Note that in the heat-treatment device 100 according to the present working example, the rotating unit 15 (that is, the table 11) is rotated by power transmission from the motor 12, and the revolving arm 30 including the lower arm 33 is rotated by power transmission from the motor 35.

The lower arm 33 may be configured by incorporating a spline shaft as a track member of a motion guide device on its upper-surface. In contrast, a transformer support portion 43, described later, may be configured by incorporating a spline nut serving as a moving member of the motion guide device. Due to the above configuration, it is possible to move the transformer support portion 43, the transformer 41, and the heat processing unit 20 arranged to foe connected to the transformer 41 in the diametrical direction relative to the ring-shaped workpiece W, and it is possible to quench the ring-shaped workpieces W with various diameters.

As illustrated in FIG. 4, the transformer 41 configured to adjust a current of the heating coil 21 included in the heat processing unit 20 is arranged on the lower arm 33 via the transformer support portion 43 configured to support the transformer 41.

The transformer 41 adjusts a current flowing through the heating coil 21. The transformer 41 according to the present working example has a thin outer shape small in lateral width. Due to the above configuration, it is possible to make the distance between the pair of revolving arms 30 small.

As illustrated in FIGS. 4, 6(a), and 6(b), the transformer 41 is provided with a heating coil attaching portion 27 configured to attach or detach the heating coil 21.

The heating coil 21 according to the present working example is configured so as to be capable of being attached to and detached from the heating coil attaching portion 27. Therefore, by only replacing the heating coil 21, it is possible to heat-process any spot of the workpiece W, such as the outer peripheral side and the inner peripheral side of the ring-shaped workpiece W, and it is possible to heat-process the workpieces W having various shapes.

For example, in order to heat a workpiece W having an approximately trapezoidal shape in cross-sectional view, a heating coil 21c having a shape following a trapezoidal shape as illustrated in FIG. 6(a) may be used. In addition, in order to heat a workpiece W having a notch of an approximately dogleg shape (approximately inclined L shape) in cross-sectional view, a heating coil 21d formed so that a portion thereof close to a workpiece W has a triangle shape in cross-sectional view as illustrated in FIG. 6(b) so as to correspond to the approximately dogleg shape (approximately inclined L shape) in cross-sectional view of the notch of the workpiece W may be used.

As described, the coolant discharge unit 23 is disposed on the heating coil 21, and the workpiece W is cooled by the coolant discharge unit 23 and a cooling device 26 fixed and arranged at a quenching finish spot of the workpiece W on the table 11.

The heat processing as described with reference to FIGS. 2(a) to 3(c) can be achieved by the heat-treatment device 100 having a specific device configuration as described above.

The workpiece W subjected to heat processing by the heat-treatment device 100 according to the present working example is used, for example, as an outer ring or an inner ring of a slewing bearing. Next, a description will be given of a slewing bearing formed of the workpieces W subjected to heat processing with reference to FIGS. 7 and 8. Here, FIG. 7 is a perspective view including a partial cross-section of a slewing bearing, and FIG. 8 is a cross-sectional view of the slewing bearing.

FIGS. 7 and 8 each illustrate a sieving bearing incorporating a spacer for a slewing bearing. V-shaped rolling surfaces 55a and 56a are formed on an outer ring 55 and an inner ring 56, respectively. A roller rolling path 57 having an approximately quadrangular shape in cross section, for example, an approximately square shape in cross section is formed between the rolling surfaces 55a and 56a. In the roller rolling path 57, a plurality of rollers 58a, 58b, . . . are arrayed and housed in such a manner that inclination directions thereof are alternately crossed. A spacer 59 for a slewing bearing (hereinafter referred to as a spacer) hatched in FIG. 7 is interposed between the plurality of rollers 58a, 58b, . . . , and holds the rollers 58a, 58b, . . . , in a predetermined attitude.

The V-shaped rolling surface 55a is formed on the inner periphery of the outer ring 55. The opening angle of the V-shape is set to approximately 90 degrees. The outer ring 55 is configured by including a pair of the ring-shaped workpieces W and is divided into upper and lower two pieces in order to insert the rollers 58 and the spacers 59. The outer ring 55 is provided with an oil filling hole 75 formed on the circumference thereof and extending from the outer periphery to the outer ring rolling surface 55a.

The inner ring 56 is fitted to the inner peripheral side of the outer ring 55 in such a manner that the outer diameter thereof approximately matches the inner diameter of the outer ring 55. The inner ring rolling surface 56a is formed on the outer periphery of the inner ring 56 so as to face the outer ring rolling surface 55a. The inner ring roll surface 56a also has a V-shape and the opening angle thereof is set to approximately 90 degrees. The outer ring roll surface 55a and the inner ring rolling surface 56a constitute the roller rolling path 57 having an approximately square shape in cross section.

In the roller roll oath 57, the rollers 53a, 53b, . . . , and the spacers 59 are alternately arranged. The rollers 58a, 58b, . . . , are configured so that their heights are slightly smaller than their outer diameters. The axes of the rollers 58a, 53b, . . . , laterally adjacent to each other with the spacer 59 interposed therebetween are crossed each other, and the rollers 58a, 58b, . . . , are classified into outward rollers 58a and inward rollers 58b. The outward roller 58a is held by the spacer 59 in an attitude such that an axis 60 thereof is directed to rotary center point P1 positioned on rotation center line P of the outer ring 55 and the inner ring 56. The inward roller 58b is held by the spacer 59 in an attitude such that an axis 61 thereof is directed to rotary center point P2 positioned on rotation center line P. Therefore, the axes of the rollers 58a, 58b, . . . , are always kept at right angles to the roller rolling path 57, and each of the roller 58a, 58b, . . . , rolls while maintaining a uniform slippage.

As described, the roller rolling path 57 can be formed of the outer ring rolling surface 55a and the inner ring rolling surface 56a by combining the workpieces W heat-processed by the heat-treatment device 100 according to the present working example. A plurality of rollers is arrayed and housed in the roller rolling path 57 and a spacer is arranged between the plurality of rollers. The roller rolls in the roller rolling path 57. The outer ring is formed of upper and lower ring-shaped workpieces W each having a trapezoidal shape in cross-sectional view, heat-processed by the heat-treatment device 100 are arranged. The inner ring is formed of approximately rectangular the workpiece W provided with a notch of an approximately dogleg shape (approximately inclined L shape) in cross-sectional view and heat-processed by the heat-treatment device 100 according to the present working example.

An embodiment and a working example of the present invention have been described above; however, the technical scope of the present invention is not limited to the scope described in the above present embodiment and the present working example. Various changes or improvements may be made to the above present embodiment and the present working example.

For example, in the heat-treatment device 10 according to the present embodiment and the heat-treatment device 100 according to the present working example, the heating coil 21 and the coolant discharge unit 23 are disposed adjacent to each other in the moving direction of the heat processing unit 20; however, the scope of the present invention is not limited to this. That is, for example, the coolant discharge unit 23 may be arranged and disposed on the heating coil 21 in the direction of a normal use state of the heat-treatment device 100.

In addition, for example, the heat-treatment device 10 according to the present embodiment and the heat-treatment device 100 according to the present working example can be applied not only to quenching, but also to tempering, annealing, and the like. In a case of tempering of the workpiece W, for example, the workpiece W may be heated by the heating coil 21 to an appropriate temperature, and then may be cooled by the coolant discharge unit 23. In a case of annealing of the workpiece W, for example, the workpiece W may be heated by the heating coil 21 to an appropriate temperature, and then may be gradually cooled by the coolant discharge unit 23.

In addition, a description has been given assuming a case where after the pair of revolving arms 30 (30a, 30b) oscillate the pair of heating coils 21 (21a, 21b) relative to the workpiece W and the pair of heating coils 21 (21a, 21b) heat the portion of the workpiece W at the quenching start position, the workpiece W is fixed on the table 11 and the workpiece W is heat-processed by revolving the heat processing units 20 by means of the revolving arms 30. However, the relative positional relationship between the workpiece W and the heat processing unit 20 may be any as long as capable of realizing the operation example of the heat-treatment device described in FIGS. 3(a) to 3(c). For example, the heat-treatment device 100 may be operated so that the heat processing unit 20 is revolved by means of the revolving arm 30 while rotating the workpiece W on the table 11.

Furthermore, in the heat-treatment device 10 according to the present embodiment and the heat-treatment device 100 according to the present working example, a case of heat-processing a constituent member of a slewing bearing as the workpiece W has been exemplified; however, the present invention is not limited to this, and the heat-treatment device 100 can be used for any ring-shaped workpiece.

Note that in the heat-treatment device 100 according to the present working example, the motion guide device is arranged on the lower arm 33 and the revolving arm 30 including the lower arm 33 can be moved in the diametrical direction relative to the ring-shaped workpiece W. However, for example, the heat-treatment device 10 may be configured by incorporating a spline shaft as a track member of the motion guide device also on the lower surface of the upper arm 31 and incorporating a spline nut as a moving member of the motion guide device on the vertical arm 32.

The heat-treatment device 10 according to the present embodiment and the heat-treatment, device 100 according to the present working example as possible mode examples of the present invention have been described above; however, another mode of the present invention and the present invention method is possible. Next, a description will be given of a heat-treatment device according to the present embodiment having features of another mode with reference to FIGS. 9 to 12(b). Note that in the following description, members the same as or similar to those in the above-described present embodiment are denoted by the same reference signs and a description thereof may be omitted.

First, a basic configuration example of a heat-treatment device 200 according to the present embodiment will be described with reference to FIGS. 9 and 11. Here, FIG. 9 is a schematic view illustrating a basic configuration example of the heat-treatment device according to the present embodiment. FIG. 11 is a schematic view for explaining a state where a coolant is discharged through a first coolant discharge unit and a second coolant discharge unit at quenching finish of the heat-treatment device according to the present embodiment.

As illustrated in FIG. 9, the heat-treatment device 200 according to the present embodiment includes the table 11 on which a ring-shaped workpiece W can be placed, and the pair of heat processing units 20 (20a, 20b) configured to heat-process the peripheral surface of the workpiece W.

The workpiece W is a material to be processed subjected to heat processing. Examples of the workpiece W according to the present embodiment include an outer ring and an inner ring constituting a slewing bearing, and the workpiece W has an approximately trapezoidal or rectangular shape in cross-sectional view. In addition, heat processing is performed on the rolling element rolling surface of the slewing bearing.

The workpiece W can be placed on the table 11. The table 11 according to the present embodiment has an approximately circular shape in plan view. It is possible to perform heat processing by placing the workpiece W on the table 11 by means of the crane 17 and fixing the workpiece W. The table 11 is configured to be rotatable with the center of the table 11 as a rotation center axis (however, in the present embodiment, the table 11 is not rotated but is fixed during heat processing).

The heat processing unit 20 is configured to heat-process the peripheral surface of the workpiece W and is configured by including the heating coil 21 (21a, 21b) configured to heat the workpiece W, a first coolant discharge unit 223 (223a, 223b) configured to cool the workpiece W, and a second coolant discharge unit 225 (225a, 225b) configured to cool the workpiece W. The heat processing unit 20 is arranged on the revolving arm 30 capable of revolving relative to the table 11 and can heat-process the peripheral surface of the workpiece W.

The heating coil 21 is configured to be arranged to be capable of facing the peripheral surface of the workpiece W. The heating coil 21 can heat the peripheral surface of the workpiece W.

The first coolant discharge unit 223 is configured to be disposed on the heating coil 21 and to be capable of discharging a coolant. For example, as illustrated in FIG. 11, the first coolant discharge unit 223 may be configured to open a plurality of holes on a side surface of the first coolant discharge unit 223 on the side opposite to the side surface of the first coolant discharge unit 223 where the heating coil 21 is disposed, and discharge a coolant through the holes. In addition, a plurality of holes may be opened on the surface of the first coolant discharge unit 223 facing the workpiece W and a coolant may be discharged through the holes. Furthermore, a plurality of holes may be opened on both the side surface of the first coolant discharge unit 223 and the surface of the first coolant discharge unit 223 facing the workpiece W.

For example, as illustrated in FIG. 11, the second coolant discharge unit 225 is configured to be arranged at a position overlapping with the heating coil 21 and to be capable of discharging a coolant. For example, a plurality of holes may be opened on the surface of the second coolant discharge unit 225 facing the workpiece W, and a coolant may be discharged through the holes. In addition, for example, a plurality of holes may be opened on a core of the heating coil 21, and a coolant may be discharged through the holes. Furthermore, for example, the plurality of holes of the second coolant discharge unit 225 may be arrayed on the surface facing the workpiece W such that the plurality of holes is positioned at winding intervals of the copper tube of the heating coil 21.

Furthermore, as illustrated in FIG. 9, in the heat-treatment device 200 according to the present embodiment, the cooling device 26 configured to cool the workpiece W after retracting the heat processing unit 20 from a quenching finish spot of the workpiece W is arranged and fixed at the quenching finish spot of the workpiece W on the table 11. For example, the cooling device 26 may be arranged to face the workpiece W processed to be an outer ring or an inner ring of a slewing bearing, and may discharge a coolant through a plurality of holes opened on a surface facing the workpiece W.

The basic configuration example of the heat-treatment device 200 according to the present embodiment has been described above. Next, a basic operation example of the heat-treatment device 200 according to the present embodiment will be described with reference to FIGS. 10(a) to 11. Here, FIGS. 10(a) to 10(d) are schematic views illustrating states of the heat-treatment device according to the present embodiment. FIG. 10(a) is a schematic view illustrating a quenching start state. FIG. 10(b) is a schematic view illustrating a state between quenching start and quenching finish. FIGS. 10(c) and 10(d) are schematic views illustrating quenching finish states. Note that a cross-hatched portion in FIGS. 10(a) to 10(d) indicates a portion of the workpiece W having been heat-processed by the heat-treatment device 200 according to the present embodiment.

In the heat-treatment device 200 according to the present embodiment, when quenching is initiated, the pair of heat processing units 20 (20a, 20b) are arranged to be adjacent to each other as illustrated in FIG. 10(a).

The heat processing unit 20a on the left side in the figure is configured so that the heating coil 21a included in the heat processing unit 20a heats the workpiece W while the heat processing unit 20a moves in the upper-left direction in the figure along the peripheral surface of the workpiece W. Then, the workpiece W heated by the heating coil 21a is sequentially cooled by the first coolant discharge unit 223a. In more detail, the heating coil 21a heats the portion of the peripheral surface of the workpiece W facing the heat processing unit 20a while the heat processing unit 20a revolves toward the upper-left in the figure, then the first coolant discharge unit 223a discharges a coolant to the heated workpiece W, and therefore the workpiece W is cooled and is heat-processed (quenched).

In the same manner as in the case of the heat processing unit 20a, the heat processing unit 20b on the right side in the figure is configured so that the heating coil 21b included in the heat processing unit 20b heats the workpiece W while the heat processing unit 20b moves toward the upper-right in the figure along the peripheral surface of the workpiece W, and the first coolant discharge unit 223b sequentially cools the heated workpiece W. In more detail, the heating coil 21b heats the portion of the peripheral surface of the workpiece W facing the heat processing unit 20b while the heat processing unit 20b revolves toward the upper-right in the figure, then the first coolant discharge unit 223b discharges a coolant to the heated workpiece W, and therefore the workpiece W is cooled and is heat-processed (quenched).

Through the above-described operation, the pair of heat processing units 20 (20a, 20b) heat-process (quench) the entire circumference of the peripheral surface of the workpiece W.

Then, as illustrated in FIG. 10(b), when the pair of heat processing units 20 (20a, 20b) move to approximately intermediate positions between quenching start and quenching finish, approximately half of the workpiece W has been heat-processed (quenched).

In the heat-treatment device 200 illustrated in FIG. 10(b), the heat processing unit 20a on the left side in the figure heats the peripheral surface of the workpiece W by means of the heating coil 21a included in the heat processing unit 20a while revolving toward the upper-right in the figure along the peripheral surface of the workpiece W. The heated workpiece W is sequentially cooled by a coolant discharged from the first coolant discharge unit 223a revolving following the heating coil 21a.

In addition, the heat processing unit 20b on the right side in the figure heats the peripheral surface of the workpiece W by means of the heating coil 21b included in the heat processing unit 20b while revolving toward the upper-left in the figure along the peripheral surface of the workpiece W. The heated workpiece W is sequentially cooled by a coolant discharged from the first coolant discharge unit 223b revolving following the heating coil 21b.

By performing heat processing as described above, the pair of heat processing units 20 (20a, 20b) move to positions adjacent to each other as illustrated in FIG. 10(c).

The pair of heat processing units 20 (20a, 20b) have a configuration such that the pair of heat processing units 20 (20a, 20b) revolve while slowing down the moving speed thereof when approaching quenching finish, and thus it is possible to heat the quenching finish portion of the workpiece W by thermal conduction.

When the pair of heat processing units 20 (20a, 20b) have moved to positions adjacent, to each other and movement of the heating coils 21 (21a, 21b) is stopped, cooling is performed by a coolant discharged from the first coolant discharge units 223 (223a, 223b) and a coolant discharged from the second coolant discharge units 225 (225a, 225b). In more detail, for example, as illustrated in FIG. 11, the entire peripheral surface of the workpiece W at a quenching finish spot, is cooled by a coolant, discharged from the side surfaces of the first coolant discharge units 223 (223a, 223b) and a coolant discharged from the second coolant discharge units 225 (225a, 225b) arranged at positions overlapping with the heating coils 21 (21a, 21b).

After the workpiece W is appropriately cooled by the second coolant, discharge units 225 (225a, 225b), the pair of heat processing units 20 (20a, 20b) retract from the quenching finish spot, and the workpiece W is further cooled by the cooling device 26 fixed and arranged at the quenching finish spot as illustrated in FIG. 10(d). Note that the pair of heat processing units 20 (20a, 20b) may be retracted, from the quenching finish spot by moving the pair of heat processing units 20 (20a, 20b) in the direction opposite to the moving direction of the pair of heat processing units 20 (20a, 20b) when performing heat processing.

Incidentally, when the revolving of the heating coils 21 (21a, 21b) is stopped as a result, of the pair of heating coils 21 (21a, 21b) having moved to positions adjacent to each other, spots other than the peripheral surface portion of the workpiece W facing the spots where the first, coolant discharge units 223 (223a, 223b) are positioned are not sufficiently cooled by the first coolant discharge units 223 (223a, 223b). Therefore, in a conventional technique, a separate cooling device is arranged for the quenching finish spot and a coolant is discharged to the central portion of the quenching finish spot. However, in such a cooling method, there may be a case where a spot not sufficiently cooled is generated in a boundary portion between a spot cooled by the first coolant discharge unit 223 (223a, 223b) and a spot cooled by the separate cooling device, a spot where the temperature rises again due to thermal conduction from inside the workpiece W is generated in the spot, annealing occurs, and therefore the workpiece W having desired properties is difficult to be obtained.

In view of the foregoing, in the heat-treatment device 200 according to the present embodiment, the peripheral surface of the workpiece heated by the heating coils 21 (21a, 21b) is also cooled by a coolant discharged from the second coolant discharge units 225 (225a, 225b), and therefore it is possible to maintain a high cooling effect at the quenching finish spot. That is, in the present embodiment, by arranging the second coolant discharge units 225 (225a, 225b), it is possible to effectively prevent the temperature of the workpiece W from rising again due to thermal conduction from inside the workpiece W.

In addition, when quenching finish is approached, the moving speed of the pair of heat, processing units 20 (20a, 20b) is slowed down and the workpiece W heated by the heating coils 21 (21a, 21b) is cooled by the first coolant discharge units 223 (223a, 223b), the second coolant discharge units 225 (225a, 225b), and the cooling device 26. Therefore, it is possible to sequentially quench the entire region from quenching start to quenching finish, and thus it is possible to prevent a quenching crack. Here, since a quenching crack is generated due to thermal expansion caused when the workpiece W is quenched, it is possible to prevent a quenching crack from being generated on the workpiece W by sequentially quenching the workpiece W from quenching start to quenching finish.

Therefore, according to the heat-treatment device 200 according to the present embodiment, the entire circumference of the peripheral surface of the workpiece W is heat-processed, and it is possible to obtain the ring-shaped workpiece W formed with a uniform hardened layer over the entire circumference.

The position where the moving speed of the pair of heat processing units 20 (20a, 20b) is slowed down may be set, for example, to a position where the pair of heat processing units 20 (20a, 20b) have reached when moved by 172° with the center of the workpiece W as a rotation axis. That is, in the heat-treatment device 200 according to the present embodiment, the range, 8°+8°=16° in the vicinity of the quenching finish spot may be set to a region heated by the heat processing units 20 (20a, 20b) while slowing down the moving speed.

However, the scope of the present invention is not limited to these, and any condition may be used as long as quenching is sequentially performed from quenching start to quenching finish and a workpiece W having desired properties can be obtained. Conditions may be appropriately changed depending on heating and cooling conditions, composition of the workpiece W, and the like.

A basic operation example of the heat-treatment device 200 according to the present embodiment has been described above. Note that, in the same manner as in the above-described present embodiment, the heat-treatment device 200 according to the present embodiment can perform heat processing according to the present embodiment by adopting the specific device configuration described with reference to FIGS. 4 to 6(b). In addition, in the same manner as in the above-described present embodiment, the workpiece W subjected to heat processing by the heat-treatment device 200 according to the present embodiment may be used, for example, as the outer ring 55 or the inner ring 56 of the slewing bearing described with reference to FIGS. 7 and 8.

An embodiment of the present invention has been described above; however, the technical scope of the present invention is not limited to the scope described in the above present embodiment. Various changes or improvements may be made to the above present embodiment.

For example, the heat-treatment device 200 according to the present embodiment is configured by including one pair of heat processing units 20; however, it is possible to arrange a plurality of pairs of the heat processing units 20 in the heat-treatment device according to the present invention. Here, FIGS. 12(a) and 12(b) are schematic views illustrating various configuration examples of the heat-treatment device according to the present embodiment.

That is, as illustrated in FIG. 12 (a), in a case of arranging three pairs of the heat processing units 20, each heat processing unit 20 can quench approximately ⅙ of the ring-shaped workpiece W. In addition, as illustrated in FIG. 12(b), in a case of arranging four pairs of the heat processing units 20, each heat processing unit 20 can quench approximately ⅛ of the ring-shaped workpiece W.

Therefore, by arranging a plurality of pairs of the heat processing units 20, it is possible to shorten a time taken for quenching compared to a case of using one pair of the heat processing units 20, and it is possible to realize a heat-treatment device with high productivity. In addition, by arranging a plurality of pairs of the heat processing units 20, it is possible to prevent accumulation of strain of the workpiece W and to reduce strain of the quenched workpiece W.

In addition, for example, in the heat-treatment device 200 according to the present embodiment, the heating coil 21 and the first coolant discharge unit 223 are disposed to be adjacent to each other in the moving direction of the heat processing unit 20; however, the scope of the present invention is not limited to this. That is, for example, the first coolant discharge unit 223 may be arranged and disposed on the heating coil 21 in the direction of a normal use state of the heat-treatment device 200.

In addition, for example, the heat-treatment device 200 according to the present embodiment can be applied not only to quenching, but also to tempering, annealing, and the like. In a case of tempering of the workpiece W, for example, the workpiece W may be heated by the heating coil 21 to an appropriate temperature, and then may be cooled by the first coolant discharge unit 223 or the second coolant discharge unit 225. In a case of annealing of the workpiece W, for example, the workpiece W may be heated by the heating coil 21 to an appropriate temperature, and then may be gradually cooled by the first coolant discharge unit 223 or the second coolant discharge unit 225.

In addition, for example, in the above-described present working example, a description has been given assuming a case where the workpiece W is fixed on the table 11 and the workpiece W is heat-processed by revolving the heat processing units 20 by means of the revolving arms 30. However, the relative positional relationship between the workpiece W and the heat processing unit 20 may be any as long as capable of realizing the basic operation example of the heat-treatment device described in FIGS. 10(a) to 11. The heat-treatment device 200 may be operated so that the heat processing unit 10 is revolved by the revolving arm 30 while rotating the workpiece W on the table 11.

Furthermore, in the heat-treatment device 200 according to the present embodiment, a case of heat-processing a constituent member of a slewing bearing as the workpiece W has been exemplified; however, the present invention is not limited to this, and the heat-treatment device 200 can be used for any ring-shaped workpiece.

Note that in the heat-treatment device 200 according to the present embodiment, the motion guide device is arranged on the lower arm 33 and the revolving arm 30 including the lower arm 33 can be moved in the diametrical direction relative to the ring-shaped workpiece W. However, for example, the heat-treatment device 200 may be configured by incorporating a spline shaft as a track member of the motion guide device also on the lower surface of the upper arm 31 and incorporating a spline nut as a moving member of the motion guide device on the vertical arm 32.

It is clear from the claims that a mode obtained by adding such a change or an improvement to the present embodiment may be included in the technical scope of the present invention.

REFERENCE SIGNS LIST 10, 100, 200: heat-treatment device, 11: table, 12, 35: motor, 13: base, 14, 34: bearing, 15: rotating unit, 16:

fixed casing, 17: crane, 19: clamping mechanism, 20: heat processing unit, 21: heating coil, 23: coolant discharge unit, 26: cooling device, 27: heating coil attaching portion, 30: revolving arm, 31: upper arm, 32: vertical arm, 33: lower arm, 41: transformer, 43: transformer support portion, 55: outer ring, 55a: outer ring rolling surface, 56: inner ring, 56a: inner ring rolling surface, 57: roller rolling path, 58a: outward roller (roller), 58b: inward roller (roller), 59: spacer for slewing bearing, 60, 61: axis, 75: oil filling hole, 223: first coolant discharge unit, 225: second coolant discharge unit, P: rotation center line, P1, P2: revolution center point, W: workpiece.

The invention claimed is:

1. A heat-treatment device comprising:
a table on which a ring-shaped workpiece is placed; and
a pair of heat processing units configured to heat-process a peripheral surface of the workpiece,
the pair of heat processing units heat-processing the workpiece while moving in opposite directions along the peripheral surface of the workpiece in order to obtain the workpiece having desired properties, the heat-treatment device further comprising:
a pair of revolving arms configured to be movable relative to the table and to heat-process the peripheral surface of the workpiece by oscillating the pair of heat processing units relative to the workpiece,
wherein the pair of heat processing units are arranged on the pair of revolving arms capable of revolving relative to the table, respectively, and
wherein
the heat processing unit includes:
a heating coil configured to be capable of being arranged to face the peripheral surface of the workpiece,
a first coolant discharge unit configured to be disposed on the heating coil and to discharge a coolant, and
a second coolant discharge unit configured to be arranged at a position overlapping with the heating coil and to discharge a coolant,
when the pair of heat processing units move in opposite directions along the peripheral surface of the workpiece, the peripheral surface of the workpiece heated by the heating coil is sequentially cooled by a coolant discharged through the first coolant discharge unit, and
when the pair of heat processing units move to positions where they are adjacent to each other, the peripheral surface of the workpiece heated by the heating coil is also cooled by a coolant discharged through the second coolant discharge unit, and an entire circumference of the peripheral surface of the workpiece is heat-processed.

2. The heat-treatment device according to claim 1, wherein
the pair of heat processing units includes:
a pair of heating coils configured to be capable of being arranged to face the peripheral surface of the workpiece, and
a pair of coolant discharge units configured to be disposed on the heating coils and to discharge a coolant, and
the pair of heating coils sandwich the pair of coolant discharge units when the pair of heat processing units oscillate.

3. The heat-treatment device according to claim 1, wherein a plurality of pairs of the heat processing units is arranged on the workpiece and a plurality of pairs of the revolving arms is arranged on the workpiece.

4. A heat-treatment method comprising:
heat-processing an entire circumference of a peripheral surface of a workpiece by using a heat-treatment device including:
a table on which a ring-shaped workpiece is placed; and
a pair of heat processing units configured to heat-process the peripheral surface of the workpiece; and
by causing the pair of heat processing units to heat-process the workpiece while moving in opposite directions along the peripheral surface of the workpiece after a pair of revolving arms capable of revolving relative to the table oscillate the pair of heat processing units relative to the workpiece to heat-process the workpiece,
wherein the pair of heat processing units are arranged on the pair of revolving arms capable of revolving relative to the table, respectively, and
wherein
the heat processing unit includes:
a heating coil configured to be capable of being arranged to face the peripheral surface of the workpiece,
a first coolant discharge unit configured to be disposed on the heating coil and to discharge a coolant, and
a second coolant discharge unit configured to be arranged at a position overlapping with the heating coil and to discharge a coolant,
when the pair of heat processing units move in opposite directions along the peripheral surface of the workpiece, the peripheral surface of the workpiece heated by the heating coil is sequentially cooled by a coolant discharged through the first coolant discharge unit, and
when the pair of heat processing units move to positions where they are adjacent to each other, the peripheral surface of the workpiece heated by the heating coil is also cooled by a coolant discharged through the second coolant discharge unit, and an entire circumference of the peripheral surface of the workpiece is heat-processed.

5. The heat-treatment device according to claim 1, wherein
a plurality of pairs of the heat processing units are arranged on the workpiece.

6. A heat-treatment method comprising:
obtaining a workpiece having desired properties by using a heat-treatment device including:
a table on which a ring-shaped workpiece is placed;
a pair of heat processing units configured to heat-process a peripheral surface of the workpiece;
a heating coil configured to be capable of being arranged to face the peripheral surface of the workpiece;
a first coolant discharge unit configured to be disposed on the heating coil and to discharge a coolant; and
a second coolant discharge unit configured to be arranged at a position overlapping with the heating coil and to discharge a coolant; and
by causing the pair of heat processing units to heat-process the workpiece while moving in opposite directions along the peripheral surface of the workpiece, the method further comprising:
sequentially cooling the peripheral surface of the workpiece heated by the heating coil by a coolant discharged through the first coolant discharge unit when the pair of heat processing units move in opposite directions along the peripheral surface of the workpiece; and
cooling the peripheral surface of the workpiece heated by the heating coil also by a coolant discharged through the second coolant discharge unit when the pair of heat processing units move to positions where they are adjacent to each other, and heat-processing the entire circumference of the peripheral surface of the workpiece,
wherein the pair of heat processing units is configured to include the heating coil.

7. The heat-treatment device according to claim 2, wherein a plurality of pairs of the heat processing units is arranged on the workpiece and a plurality of pairs of the revolving arms is arranged on the workpiece.

* * * * *